United States Patent
Moffa et al.

[11] Patent Number: 6,003,905
[45] Date of Patent: Dec. 21, 1999

[54] REFRIGERANT ACCESS MANIFOLD

[75] Inventors: Jeff Allen Moffa, Plymouth; Fred Georg Schroeder, Grosse Ile., both of Mich.

[73] Assignee: Ford Motor Company, Dearborn, Mich.

[21] Appl. No.: 08/979,010

[22] Filed: Nov. 26, 1997

Related U.S. Application Data

[63] Continuation of application No. 08/521,489, Aug. 30, 1995, abandoned.

[51] Int. Cl.$^6$ ........................................ F16L 41/00
[52] U.S. Cl. ...................... 285/133.11; 285/280; 285/406
[58] Field of Search ............................... 285/382, 133.11, 285/280, 133.3, 363, 406

[56] References Cited

U.S. PATENT DOCUMENTS

| | | | |
|---|---|---|---|
| 1,803,577 | 5/1931 | Weatherhead, Jr. | 285/256 X |
| 2,497,441 | 2/1950 | Detweiler | 285/156 X |
| 2,540,649 | 2/1951 | Boylan . | |
| 3,092,404 | 6/1963 | MacWilliams | 285/382 X |
| 3,119,411 | 1/1964 | Bock et al. | 285/156 X |
| 3,416,818 | 12/1968 | Conlin | 285/156 X |
| 3,526,419 | 9/1970 | Saguchi . | |
| 3,916,641 | 11/1975 | Mullins . | |
| 3,996,765 | 12/1976 | Mullins . | |
| 3,997,140 | 12/1976 | Mullins . | |
| 4,069,686 | 1/1978 | Hoelman . | |
| 4,330,144 | 5/1982 | Ridenour . | |
| 4,709,947 | 12/1987 | Kniess . | |
| 4,726,399 | 2/1988 | Miller . | |
| 4,784,412 | 11/1988 | Van Dongen | 285/156 X |
| 5,046,765 | 9/1991 | Usui | 285/156 X |
| 5,323,808 | 6/1994 | Shimizu . | |
| 5,383,338 | 1/1995 | Bowsky et al. . | |

FOREIGN PATENT DOCUMENTS

| | | | |
|---|---|---|---|
| 276483 | 8/1988 | European Pat. Off. | 285/382 |
| 467792 | of 1928 | Germany . | |
| 2224440 | 12/1973 | Germany | 285/150 |
| 4160191 | 6/1992 | Japan | 285/382 |
| 5141580 | 6/1993 | Japan | 285/382 |

*Primary Examiner*—H. Shackelford
*Attorney, Agent, or Firm*—Raymond L. Coppiellie

[57] ABSTRACT

A refrigerant access manifold for a refrigerant system includes a manifold block for coupling a plurality of refrigerant system components together to allow refrigerant to flow therethrough and at least one access port in the manifold block to provide access to the refrigerant.

6 Claims, 3 Drawing Sheets

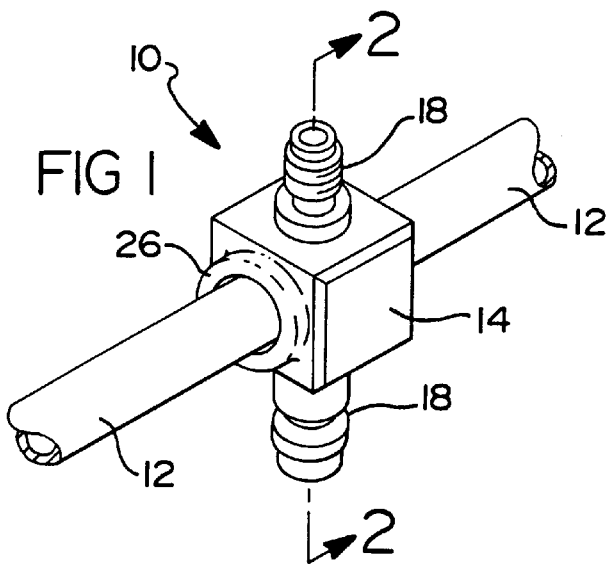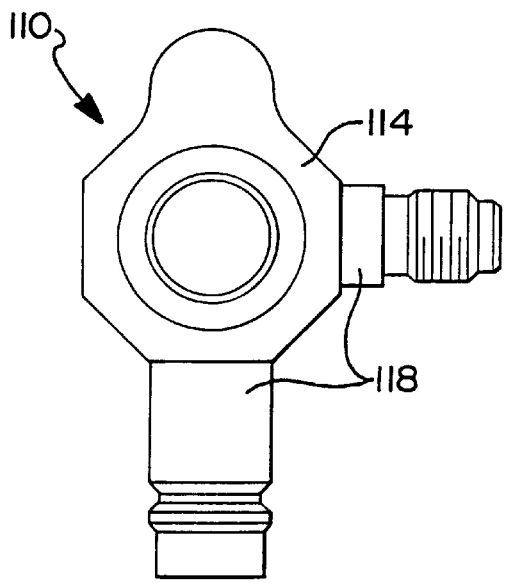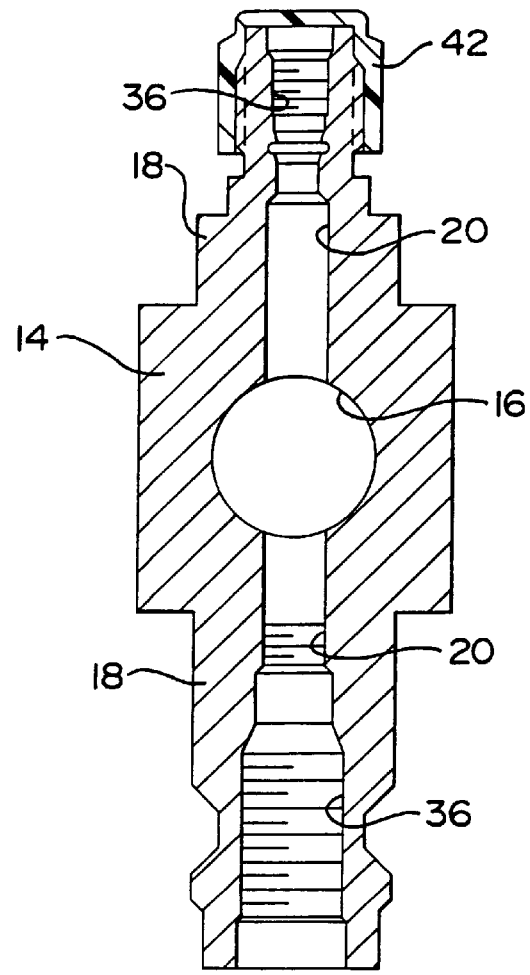

REFRIGERANT ACCESS MANIFOLD

This is a continuation of United States patent application Ser. No. 08/521,489, filed Aug. 30, 1995 abandoned.

BACKGROUND OF THE INVENTION

1. Field of the Invention

The present invention relates generally to refrigerant systems and, more specifically, to an access manifold for a refrigerant system.

2. Description of the Related Art

It is known to provide a refrigerant system with refrigerant system components. Typically, the refrigerant system components include tubing such as aluminum tubing through which a refrigerant flows. To provide access to the refrigerant system, it is known to provide an aperture in the aluminum tubing and to dispose a refrigerant system device in the aperture. The refrigerant system device is brazed to the aluminum tubing. Also, to control the refrigerant system, it is known to provide an aperture in the aluminum tubing and to dispose a refrigerant system device in the aperture. The refrigerant system device is also brazed to the aluminum tubing.

One disadvantage of the above refrigerant system is that individual refrigerant system devices must be provided to allow access to the refrigerant system. Another disadvantage is that the individual refrigerant system devices are brazed to the aluminum tubing which may result in a high rate of leaks and repair. Yet another disadvantage is that the individual refrigerant system devices are provided at various locations along the aluminum tubing which may result in weak tubing and increased complexity.

SUMMARY OF THE INVENTION

Accordingly, the present invention is a refrigerant access manifold for a refrigerant system including a manifold block for coupling a plurality of refrigerant system components together to allow refrigerant to flow therethrough and at least one access port in the manifold block to provide access to the refrigerant.

One advantage of the present invention is that a refrigerant access manifold is provided for a refrigerant system. Another advantage of the present invention is that the refrigerant access manifold allows multiple access to the refrigerant system at one location. Yet another advantage of the present invention is that the refrigerant access manifold provides for the coupling of refrigerant system components at one location. Still another advantage of the present invention is that the refrigerant access manifold has access ports which are integral, resulting in a brazeless system with reduced leaks and repair. A further advantage of the present invention is that the refrigerant access manifold provides for a modular assembly with reduced complexity. A still further advantage of the present invention is that the refrigerant access manifold allows more than one refrigerant system device to be attached to the refrigerant system at one location, thus reducing complexity. Yet a further advantage of the present invention is that the refrigerant access manifold allows for infinite orientation possibilities of various refrigerant system devices.

Other features and advantages of the present invention will be readily appreciated as the same becomes better understood after reading the subsequent description taken in conjunction with the accompanying drawings.

BRIEF DESCRIPTION OF THE DRAWINGS

FIG. 1 is a perspective view of a refrigerant access manifold according to the present invention.

FIG. 2 is a sectional view taken along line 2—2 of FIG. 1.

FIG. 4 is an elevational view of another refrigerant access manifold according to the present invention.

DESCRIPTION OF THE PREFERRED EMBODIMENT(S)

Figure 3:
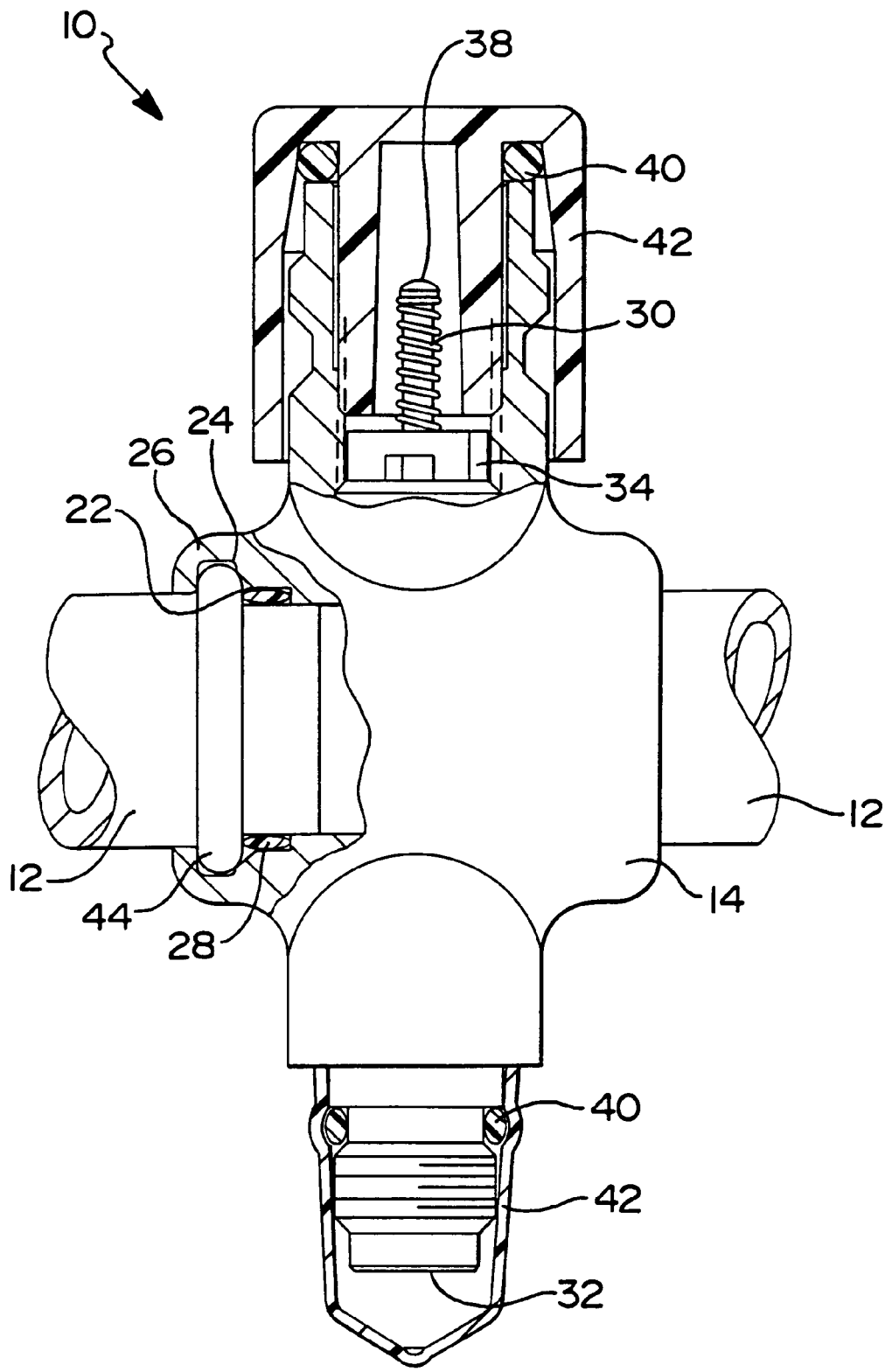
FIG. 3 is a fragmentary elevational view of the refrigerant access manifold of FIG. 1.

Referring to the drawings and in particular to FIG. 1, one embodiment of a refrigerant access manifold 10, according to the present invention, is shown. The refrigerant access manifold 10 provides access and couples together refrigerant system components 12 such as tubes or hoses of a refrigerant system (not shown). It should be appreciated that the refrigerant system components 12 include, but are not limited to, tube assemblies, hose assemblies, condensers, evaporators, receiver dryers, accumulators, and compressors.

Referring to FIGS. 1 through 3, the refrigerant access manifold 10 includes a housing or manifold block 14. As illustrated, the manifold block 14 has a generally rectangular configuration although any other suitable configuration may be used such as cylindrical. The manifold block 14 is made of a metal material such as aluminum. The manifold block 14 has a hollow interior forming a chamber 16. The manifold block 14 also has at least one, preferably a plurality of access housings 18 extending outwardly from the manifold block 14. In the illustrated embodiment, a pair of access housings 18 are disposed opposite one another and extend outwardly from the manifold block 14. The access housings 18 are made of a metal material such as aluminum. The access housings 18 are integral to the manifold block 14 and are formed as one piece. The manifold block 14 and access housings 18 are formed by suitable methods such as impact extrusion, bar extrusion, machining and semi-solid shaping, such methods being known in the art.

Each of the access housings 18 include an access port 20 communicating with the chamber 16. The manifold 14 further includes at least one, preferably a plurality of coupling cavities 22 for receiving the refrigerant system components 12. In the illustrated embodiment, a pair of coupling cavities 22 are disposed opposite one another and generally perpendicular to the access housings 18. The coupling cavities 22 are annular. The coupling cavities 22 include a shoulder 24 and a flange 26 extending outwardly from the manifold block 14. The manifold block 14 also includes a seal 28 such as an O-ring disposed in each of the coupling cavities 22 for a function to be described.

The refrigerant access manifold 10 includes a refrigerant system device for each of the access housings 18. The refrigerant system device includes, but is not limited to, a charge valve, service valve, pressure relief valve, clutch cycling switch, and high pressure cut-out (HPCO) switch or refrigerant containment switch (RCS). In the illustrated embodiment, the refrigerant access manifold 10 includes a charge valve 30 disposed in one of the access housings 18 and a service valve 32 disposed in the other access housing 18. The charge valve 30 and service valve 32 include a threaded member 34 threadably engaging a threaded portion 36 of the access port 20 and a valve core 38 cooperating with the threaded member 34. It should be appreciated that the charge valve 30 and service valve 32 may include a seal 40 and closure 42 to close the access housing 18. It should also be appreciated that the charge valve 30 and service valve 32 are conventional and known in the art.

To couple the refrigerant system components 12 to the refrigerant access manifold 10, one end of the refrigerant system component 12 is disposed in the coupling cavity 22. As illustrated in FIG. 3, the refrigerant system component 12 is disposed within the seal 28 and has a flange 44 which abuts the shoulder 24. The flange 26 is then rolled over the flange 44 to secure the refrigerant system component 12 within the coupling cavity 22.

Referring to FIG. 4, another refrigerant access manifold 110, according to the present invention, is shown. Like parts of the refrigerant access manifold 10 have like reference numerals increased by one hundred (100). The refrigerant access manifold 110 has the manifold block 114 in a "peanut" configuration as is known in the art. The access housings 118 are disposed at an angle of approximately ninety degrees (90°) relative to each other. The refrigerant system components 12 may be coupled to the manifold block 114 similar to the refrigerant access manifold 10 or by alternative methods including, but not limited to, brazing, O-ring, or gaskets as is known in the art.

Figure 5:
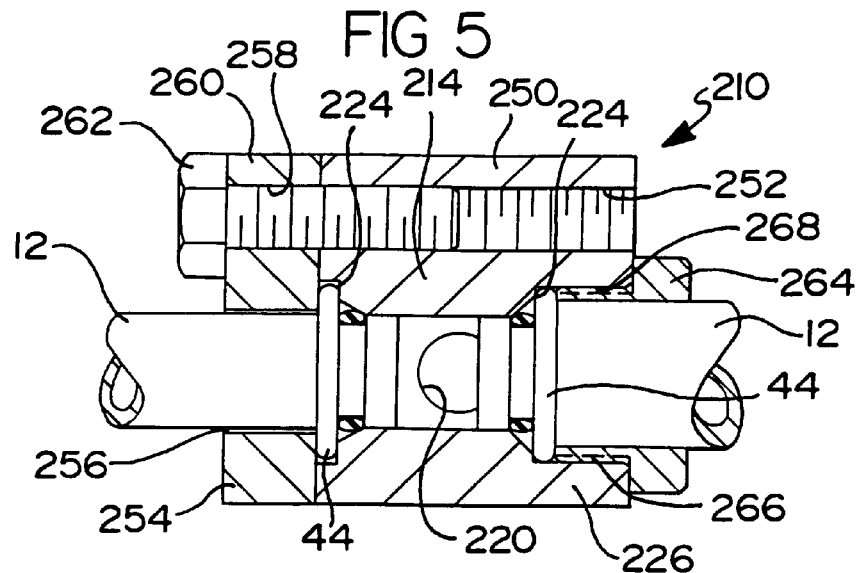
FIG. 5 is a fragmentary view of yet another refrigerant access manifold according to the present invention.

Referring to FIG. 5, yet another refrigerant access manifold 210, according to the present invention, is shown. Like parts of the refrigerant access manifold 10 have like reference numerals increased by two hundred (200). The refrigerant access manifold 210 has a manifold block 214 with a flange 250 extending outwardly with a threaded aperture 252 extending therethrough. The manifold block 214 has the access ports 220 at an angle of approximately one hundred twenty degrees (120°) relative to each other. The refrigerant access manifold 210 includes a peanut connection 254 disposed adjacent one end of the manifold block 214. The peanut connection 254 has an aperture 256 extending therethrough for receiving the refrigerant system component 12. The peanut connection 254 also has a threaded aperture 258 extending through a flange 260 thereof. The refrigerant access manifold 210 includes a threaded fastener 262 threadably engaging the threaded apertures 258 and 252 to secure the peanut connection 254 to the manifold block 214. It should be appreciated that the flange 44 of the refrigerant system component 12 is sandwiched between the peanut connection 254 and the shoulder 224 of the manifold block 214.

The refrigerant access manifold 210 also includes a male swivel nut 264 to connect the other refrigerant system component 12 to the manifold block 214. The swivel nut 264 has a threaded flange 266 which threadably engages an interior threaded portion 268 on the flange 226 of the coupling cavity 222. It should be appreciated that the flange 44 of the refrigerant system component 12 is sandwiched between the threaded flange 266 and the shoulder 224 of the manifold block 214. It should also be appreciated that the refrigerant system components 12 may be coupled to the manifold block 214 by any suitable means such as welding or brazing.

Figure 6:
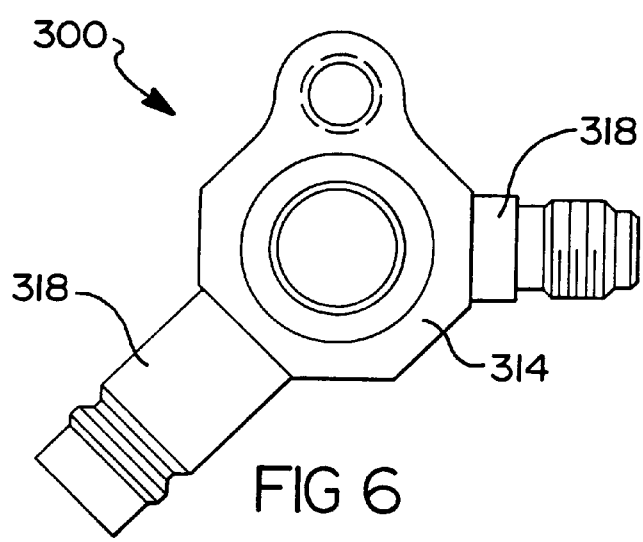
FIG. 6 is an elevational view of still another refrigerant access manifold according to the present invention.

Referring to FIG. 6, still another refrigerant access manifold 310, according to the present invention, is shown. Like parts of the refrigerant access manifold 10 have like reference numerals increased by three hundred (300). The refrigerant access manifold 310 has the manifold block 314 in a peanut configuration with the access housings 318 disposed at an angle of approximately one hundred twenty degrees (120°) relative to each other. It should be appreciated that the manifold block 314 may be circular to allow infinite variability of disposing the access housings 318 relative to each other. It should also be appreciated that an end of the access housings 318 may be threaded. It should further be appreciated that the refrigerant system components 12 may be coupled to the manifold block 310 in any suitable manner as previously described.

Figure 7:
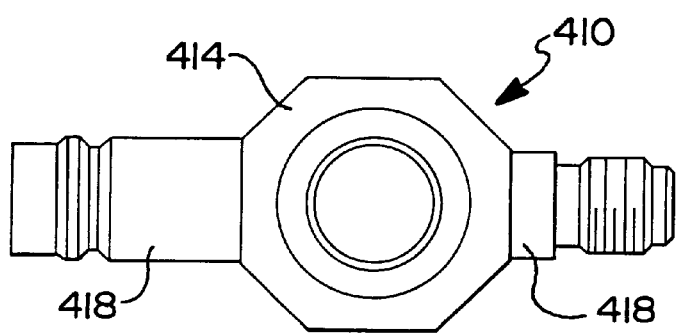
FIG. 7 is an elevational view of another refrigerant access manifold according to the present invention.

Referring to FIG. 7, another refrigerant access manifold 410, according to the present invention, is shown. Like parts of the refrigerant access manifold 10 have like reference numerals increased by four hundred (400). The refrigerant access manifold 410 has a manifold block 414 in a peanut configuration with the access housings 418 disposed at an angle of approximately one hundred eighty degrees (180°). It should be appreciated that the refrigerant system components 12 may be coupled to the manifold block 414 in any suitable manner as previously described.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A refrigerant system comprising:
   a plurality of refrigerant system components;
   a refrigerant manifold block having a hollow interior forming a chamber and a plurality of coupling cavities for receiving and for coupling said refrigerant system components together to allow refrigerant to flow therethrough; and
   at least one access housing extending outwardly from said manifold block, said manifold block and said at least one access housing being monolithic, integral and formed as one-piece, said at least one access housing having at least one access port communicating with said chamber to provide access to the refrigerant wherein each of said refrigerant system components has a flange and at least one of said coupling cavities has a shoulder to abut said flange on said refrigerant system components.

2. A refrigerant system as set forth in claim 1 wherein said at least one access housing has a threaded portion at one end.

3. A refrigerant system as set forth in claim 1 including a flange extending outwardly from said manifold block about one of said coupling cavities and being displaced to sandwich said flange on the one of said refrigerant system components between said shoulder and said flange on said manifold block.

4. A refrigerant system comprising:
   a plurality of refrigerant system components;
   a refrigerant manifold block having a hollow interior forming a chamber and a plurality of coupling cavities for receiving and for coupling said refrigerant system components together to allow refrigerant to flow therethrough; and
   a plurality of refrigerant system devices on said refrigerant manifold block, each of said refrigerant system devices including an access housing extending outwardly from said manifold block, said manifold block and said access housing being monolithic, integral and formed as one-piece, said access housing having an access port communicating with said chamber to provide access to the refrigerant wherein one of said refrigerant system components has a flange and each of said coupling cavities has a shoulder to abut said flange on the one of said refrigerant system components.

5. A refrigerant system as set forth in claim 4 wherein said access housing has a threaded portion at one end.

6. A refrigerant system as set forth in claim 4 including a flange extending outwardly from said manifold block about at least one of said coupling cavities and being displaced to sandwich the flange of the refrigerant system component between said shoulder and said flange on said manifold block.

* * * * *